United States Patent
Geirhofer et al.

(10) Patent No.: US 9,155,098 B2
(45) Date of Patent: Oct. 6, 2015

(54) CHANNEL STATE INFORMATION REFERENCE SIGNAL (CSI-RS) CONFIGURATION AND CSI REPORTING RESTRICTIONS

(71) Applicant: QUALCOMM Incorporated, San Diego, CA (US)

(72) Inventors: Stefan Geirhofer, San Diego, CA (US); Wanshi Chen, San Diego, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 92 days.

(21) Appl. No.: 13/830,821

(22) Filed: Mar. 14, 2013

(65) Prior Publication Data

US 2013/0258965 A1 Oct. 3, 2013

Related U.S. Application Data

(60) Provisional application No. 61/617,613, filed on Mar. 29, 2012, provisional application No. 61/637,683, filed on Apr. 24, 2012, provisional application No. 61/679,646, filed on Aug. 3, 2012.

(51) Int. Cl.
*H04W 4/00* (2009.01)
*H04W 72/04* (2009.01)
*H04L 1/00* (2006.01)

(52) U.S. Cl.
CPC ........... *H04W 72/048* (2013.01); *H04L 1/0026* (2013.01); *H04L 1/0027* (2013.01)

(58) Field of Classification Search
CPC .. H04L 5/0057; H04L 1/0026; H04W 72/048
USPC ......................................... 370/329, 216–218
See application file for complete search history.

(56) References Cited

U.S. PATENT DOCUMENTS

| | | | |
|---|---|---|---|
| 2009/0168718 A1* | 7/2009 | Wang et al. | 370/330 |
| 2011/0222473 A1 | 9/2011 | Breit et al. | |
| 2012/0147773 A1 | 6/2012 | Kim et al. | |
| 2012/0208547 A1 | 8/2012 | Geirhofer et al. | |
| 2012/0213261 A1 | 8/2012 | Sayana et al. | |
| 2013/0196675 A1* | 8/2013 | Xiao et al. | 455/452.1 |
| 2013/0208604 A1* | 8/2013 | Lee et al. | 370/252 |
| 2014/0161091 A1* | 6/2014 | Adhikary et al. | 370/329 |

FOREIGN PATENT DOCUMENTS

| | | | |
|---|---|---|---|
| EP | 2575278 A1 | 4/2013 | |
| WO | 2009123549 A2 | 10/2009 | |
| WO | WO 2009123549 A2 * | 10/2009 | |
| WO | 2011040751 A2 | 4/2011 | |
| WO | 2011103309 A2 | 8/2011 | |
| WO | 2012022249 A1 | 2/2012 | |
| WO | 2012173535 A1 | 12/2012 | |
| WO | WO 2012173535 A1 * | 12/2012 | |
| WO | WO 2013114422 A1 * | 8/2013 | |

OTHER PUBLICATIONS

International Search Report and Written Opinion—PCT/US2013/032356—ISA/EPO—May 6, 2013.

* cited by examiner

*Primary Examiner* — Andrew Chriss
*Assistant Examiner* — Voster Preval
(74) *Attorney, Agent, or Firm* — Seyfarth Shaw LLP

(57) ABSTRACT

A method of wireless communication includes determining a capability for a number of channel state information configurations supported by a user equipment (UE). The channel state information processes link a channel measurement report with an interference measurement report. The UE transmits the capability to an eNodeB. Additionally, the UE receives CSI process configurations. The CSI process configurations identify CSI processes that can be requested by the eNodeB.

22 Claims, 13 Drawing Sheets

CHANNEL STATE INFORMATION REFERENCE SIGNAL (CSI-RS) CONFIGURATION AND CSI REPORTING RESTRICTIONS

CROSS-REFERENCE TO RELATED APPLICATIONS

This application claims the benefit under 35 U.S.C. §119(e) to U.S. Provisional Patent Application No. 61/617,613 entitled "CSI-RS CONFIGURATION AND CSI REPORTING RESTRICTIONS TO INCREASE PROCESSING TIME FOR FEEDBACK REPORTING," filed on Mar. 29, 2012, U.S. Provisional Patent Application No. 61/637,683 entitled "CHANNEL STATE INFORMATION REFERENCE SIGNAL (CSI-RS) CONFIGURATION AND CSI REPORTING RESTRICTIONS," filed on Apr. 24, 2012, and U.S. Provisional Patent Application No. 61/679,646 entitled "CHANNEL STATE INFORMATION REFERENCE SIGNAL (CSI-RS) CONFIGURATION AND CSI REPORTING RESTRICTIONS," filed on Aug. 3, 2012, the disclosures of which are expressly incorporated by reference herein in their entireties.

BACKGROUND

1. Field

Aspects of the present disclosure relate generally to wireless communication systems, and more particularly to configuring channel state information reference signal (CSI-RS) reporting configurations to reduce CSI re-computations.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

Receiving channel measurement resources and/or interference measurement resources may trigger the re-computation of channel state information (CSI) for the purposes of CSI reporting. The number of CSI re-computations may be reduced by limiting the number of CSI processes based on the UE's capability. Additionally, the number of CSI re-computations may be reduced by permitting the use of outdated CSI measurements.

In one aspect of the present disclosure, a method of wireless communication is disclosed. The method includes determining a UE capability corresponding to a maximum number of supported CSI processes. The method also includes transmitting the UE capability to an eNodeB. The method further includes receiving multiple CSI process configurations. The CSI process configurations identify CSI processes that can be requested by the eNodeB.

In another aspect of the present disclosure, a computer program product for wireless communications in a wireless network having a non-transitory computer-readable medium is disclosed. The computer readable medium has non-transitory program code recorded thereon which, when executed by the processor(s), causes the processor(s) to perform operations of determining a UE capability corresponding to a maximum number of supported CSI processes. The program code also causes the processor(s) to transmit the UE capability to an eNodeB. The program code further causes the processor(s) to receive CSI process configurations. The CSI process configurations identify CSI processes that can be requested by the eNodeB.

Another aspect of the present disclosure discloses wireless communication having a memory and at least one processor coupled to the memory. The processor(s) is configured to determine a UE capability corresponding to a maximum number of supported CSI processes. The processor(s) is also configured to transmit the UE capability to an eNodeB. The processor(s) is further configured to receive CSI process configurations. The CSI process configurations identify CSI processes that can be requested by the eNodeB.

In one aspect of the present disclosure, a method of wireless communication is disclosed. The method includes receiving a capability for a number of supported channel state information configurations. The method also includes transmitting CSI process configurations. The CSI process configurations identify CSI processes that can be requested by the eNodeB.

Another aspect of the present disclosure discloses an apparatus including means for receiving a capability for a number of supported channel state information configurations. The apparatus also includes means for transmitting CSI process configurations. The CSI process configurations identify CSI processes that can be requested by the eNodeB.

In another aspect of the present disclosure, a computer program product for wireless communications in a wireless network having a non-transitory computer-readable medium is disclosed. The computer readable medium has non-transitory program code recorded thereon which, when executed by the processor(s), causes the processor(s) to perform operations of receiving a capability for a number of supported channel state information configurations. The program code also causes the processor(s) to transmit CSI process configurations. The CSI process configurations identify CSI processes that can be requested by the eNodeB.

Another aspect of the present disclosure discloses wireless communication having a memory and at least one processor coupled to the memory. The processor(s) is configured to receive a capability for a number of supported channel state information configurations. The processor(s) is also configured to transmit CSI process configurations. The CSI process configurations identify CSI processes that can be requested by the eNodeB.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
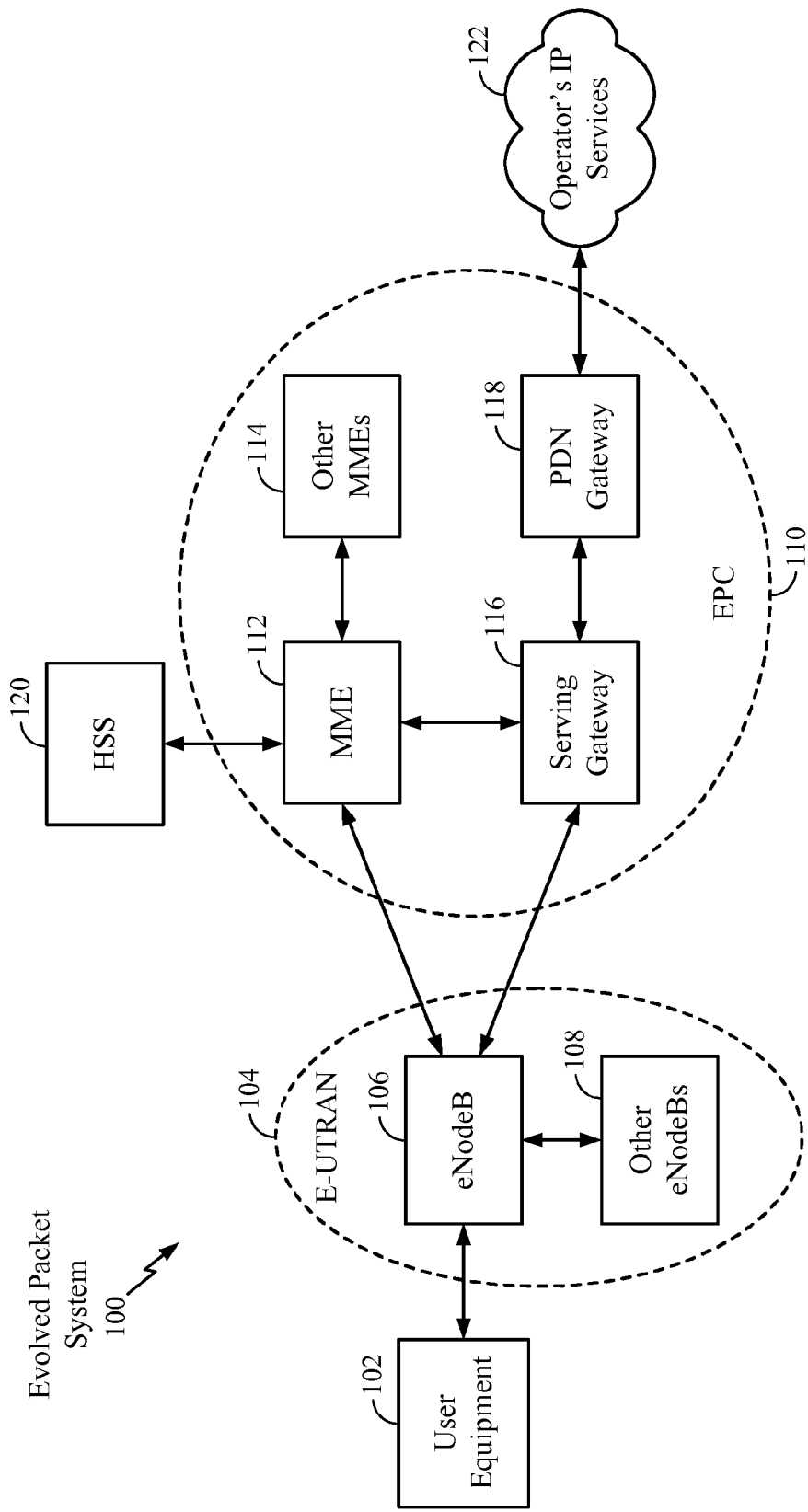
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
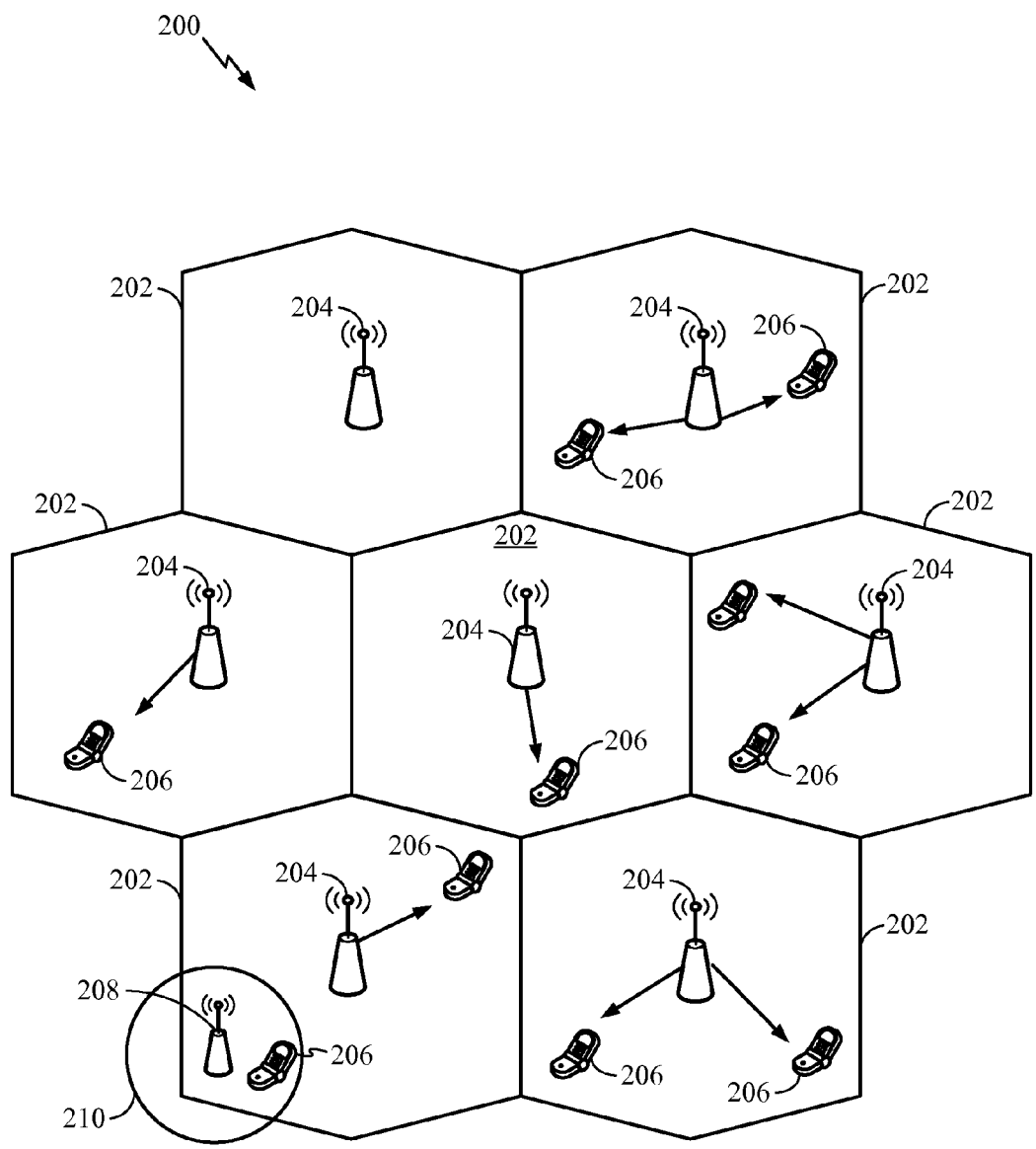
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be a remote radio head (RRH), a femto cell (e.g., home eNodeB (HeNB)), a pico cell, or a micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
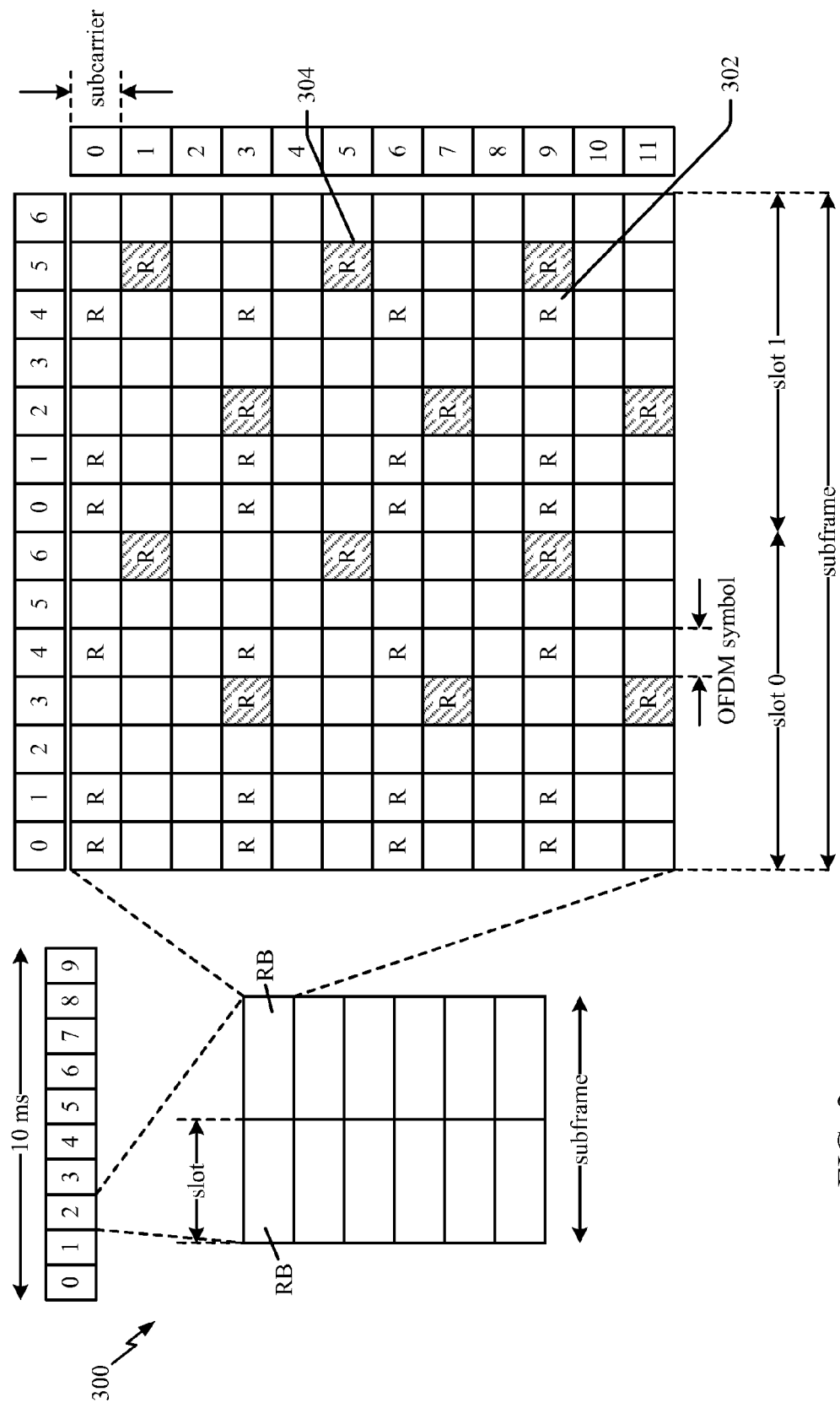
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
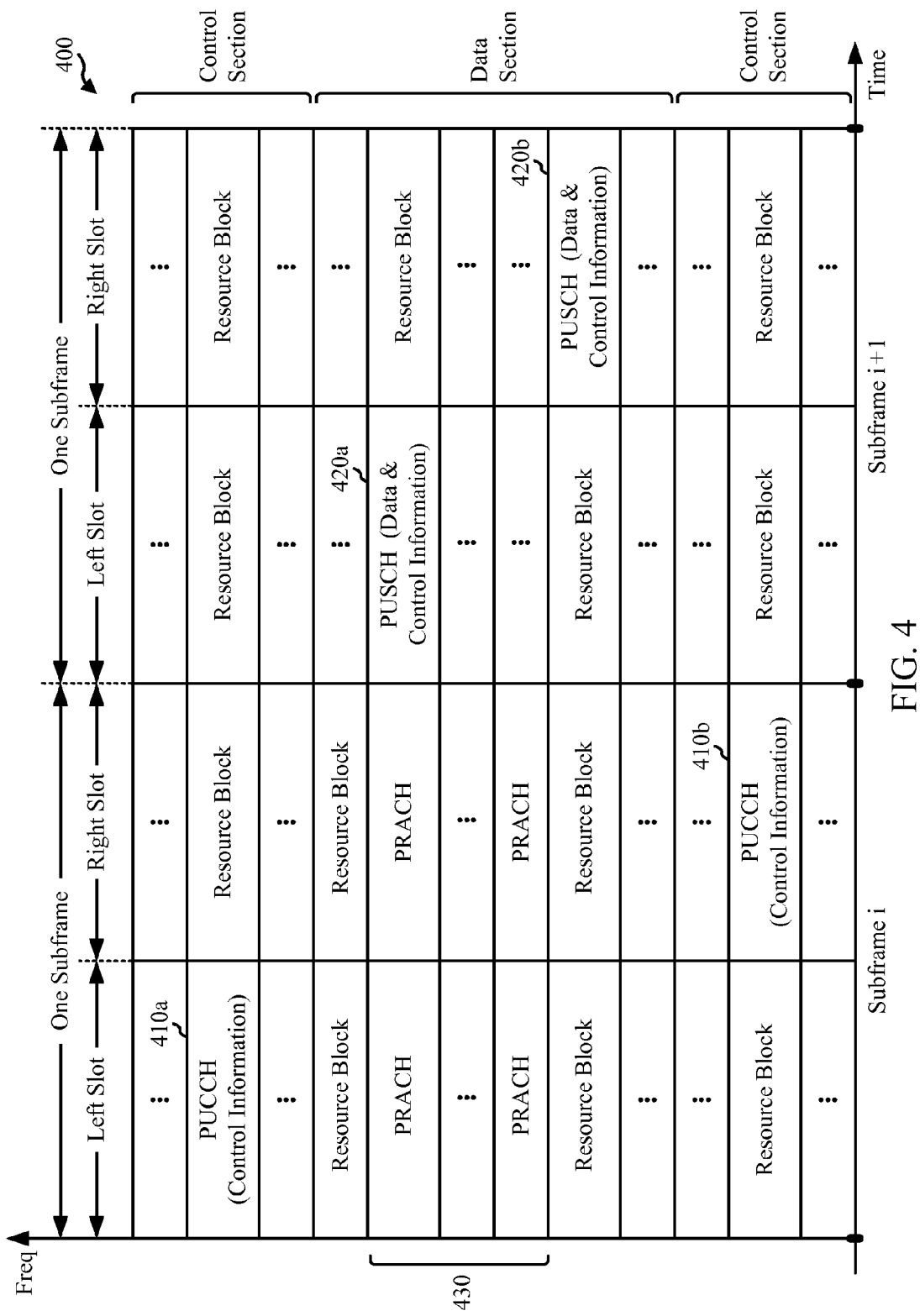
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
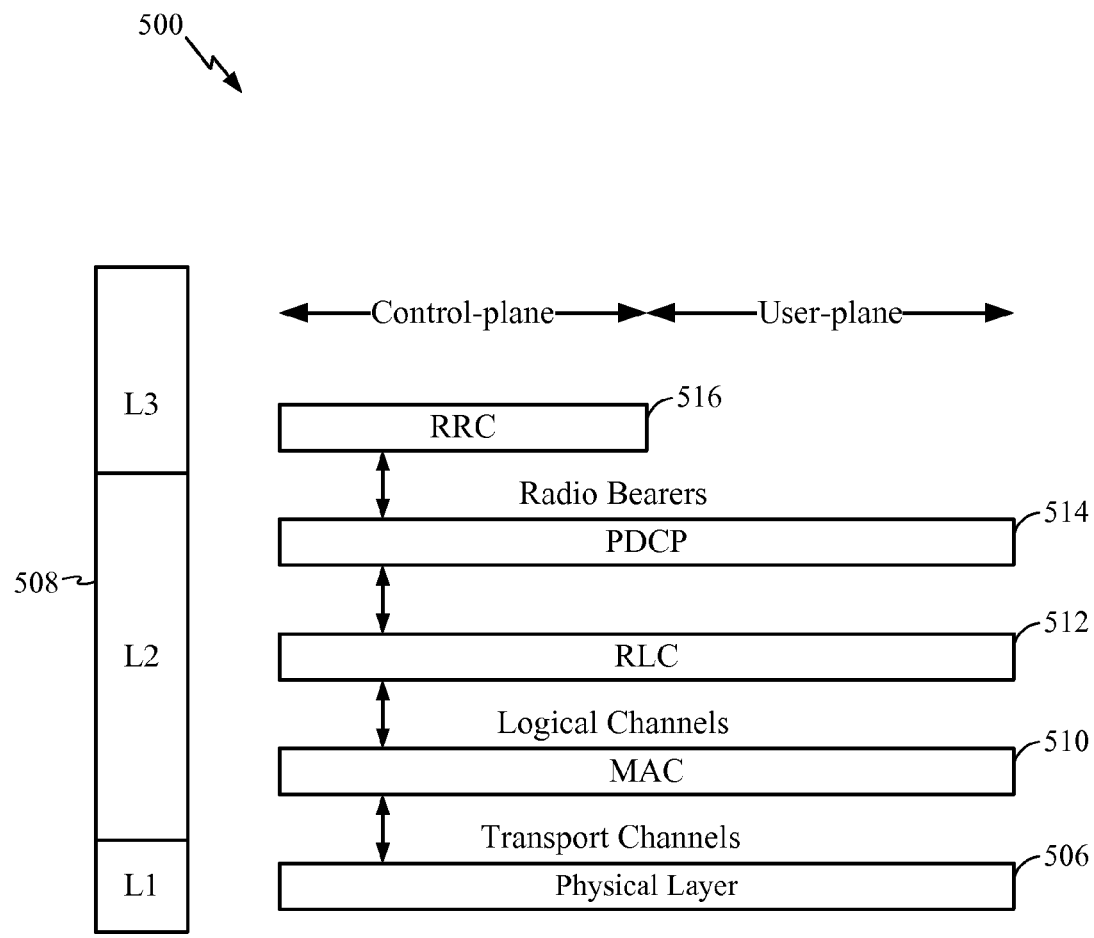
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
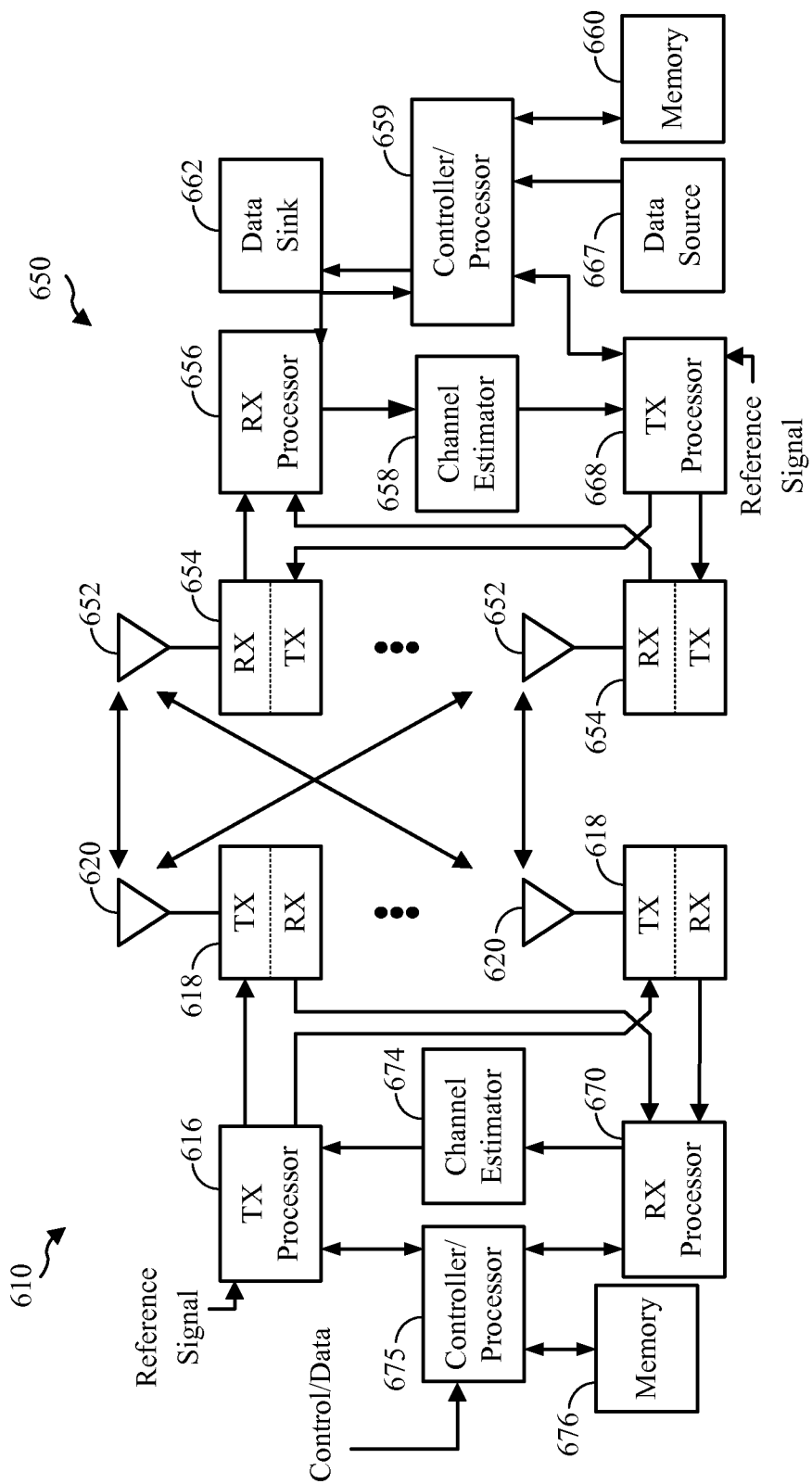
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

CSI-RS Configurations and CSI Reporting Restrictions to Increase Processing Time for Feedback Reporting Various channel state information (CSI) feedback frameworks may be specified to support downlink coordinated multi-point (CoMP) operations. The feedback frameworks may be based on non-zero power (NZP) and/or zero-power (ZP) channel state information reference signal (CSI-RS) resources. Channel measurements may be performed based on non-zero power CSI-RS resources. Additionally, interference measurements may be performed based on zero-power resources, non-zero power CSI-RS resources, or a combination thereof.

In some cases, channel measurement resources and/or interference measurement resources may be specified to enable CSI feedback for different feedback frameworks and/or interference hypotheses. Multiple channel measurement resources may be used to provide CSI feedback for different serving assumptions. For example, in one configuration, multiple channel measurement resources are specified for dynamic point selection (DPS) so that the CSI is reported for channel conditions from two separate transmission points. The channel measurement resources may also be specified for other types of CoMP operation.

As previously discussed, the interference measurement resources may include zero power CSI-RS resources, non-zero power CSI-RS resources, or a combination thereof. A UE may be configured to measure interference on an interference measurement resource to provide CSI feedback under different interference assumptions. That is, for each interference measurement resource, the UE may measures interference on the resources that include the interference measurement resource.

In one configuration, by scheduling specific transmissions, the network facilitates the interference measurement using different interfering assumptions on different interference measurement resources. For example, in one configuration, the network aligns the interference conditions with the interference measurement resources so that the interference measurement resources represent the potential (or actual) interference conditions experienced by the UE.

In another configuration, a CSI process is specified to link the channel measurement resources and the interference measurement resources. That is, each CSI process may include one or more channel measurement resources and interference measurement resources. The CSI processes may be referred to as CSI feedback reporting configurations or CSI process configurations.

In the present configuration, the UE determines the CSI feedback based on both the channel measurement resources and interference measurement resources identified in a CSI process. The channel measurement resources and interference measurement resources are not limited to being distinct between various CSI processes. For example, two different CSI processes may use the same interference measurement resource but different channel measurement resources.

Multiple CSI processes may increase the complexity of measuring the CSI and generating feedback reports. For example, if the channel measurement resources and interference measurement resources corresponding to different CSI processes are configured in the same subframe, a UE may simultaneously process the CSI for all the channel measurement resources and interference measurement resources in the same subframe. The simultaneous processing may increase the complexity of measuring the CSI and generating a feedback report.

Thus, in one aspect of the present disclosure, a number of channel measurement resources and interference measurement resources included in the channel state information feedback reports may be limited to reduce the complexity of measuring CSI and generating a feedback report. Specifically, in one configuration, the CSI process includes at maximum number of channel measurement resources and interference measurement resources in the same subframe. The maximum number of channel measurement resources and interference measurement resources may be predefined or dynamically configured. Accordingly, the processing overhead for the UE may be reduced by limiting the number of channel measurement resources.

In one configuration, CSI processes are restricted to a specific number of channel measurement resources ($N_c$). Furthermore, as previously discussed, the network may also restrict the number of channel measurement resources ($M_c$) within the same subframe. For example, the number of channel measurement resources may be limited to three (e.g., $N_c$ equals three) and the number of channel measurement resources within the same subframe may be limited to two (e.g., $M_c$ equals two).

In another configuration, the CSI processes are restricted to a predefined number of interference measurement resources ($N_i$). Furthermore, the network may also restrict the number of interference measurement resources ($M_i$) within the same subframe. For example, the number of channel measurement resources may be limited to three (e.g., $M_i$ equals three) and the number of interference measurement resources within the same subframe may be limited to two (e.g., $M_i$ equals two).

In still another configuration, the maximum number of channel measurement resources and interference measurement resources configured within a subframe is based on whether resource restricted CSI subframe sets are configured. The restricted CSI subframe sets enable UEs to restrict the averaging of CSI information to a single subframe set. Accordingly, when the resource restricted CSI subframe sets are configured, separate CSI reports may be generated for the different interference hypotheses. For example, the different interference hypotheses may be based on an enhanced inter-cell interference coordination (eICIC) model and may identify whether macro interference is present on specific subframes.

As previously discussed, the UE's complexity may increase as a result of the need to generate multiple CSI reports for different subframe sets. For example, subframe sets may be enabled or disabled by configuration on a per CSI process basis. If subframe sets are enabled for a given CSI process, two interference hypotheses may exist for this CSI process. One interference hypotheses may be for interference measurement resource occurrences that fall into the first subframe set and another interference hypotheses may be for interference measurement resource occurrences that fall into the second subframe set. In contrast, if subframe sets are disabled for a given CSI process, only one interference hypothesis exists. Therefore, there is no need to differentiate interference measurement resource occurrences. Consequently, when subframe sets are configured, a UE's processing requirements may increase due to the need to process CSI information under two separate interference hypotheses.

Thus, in one configuration, the processing burden of a UE may be reduced when subframe sets are configured to limit the number of channel measurement resources and/or the number of interference measurement resources to numbers that are less than the corresponding maximum number of channel measurement resources and the maximum number of interference measurement resources supported by the UE when subframe sets are not configured, either overall or within a given subframe. That is, to reduce the UE's complexity the maximum number of channel measurement resources and the maximum number of interference measurement resources assigned to a UE when subframe sets are configured may be limited to be less than the maximum number of channel measurement resources, and/or the maximum number of interference measurement resources that are supported by the UE when the subframe sets are not configured. Similarly, the number of channel measurement resources and the number of interference measurement resources allowed within a single subframe when subframe sets are configured may be limited to be less than the maximum channel measurement resources and/or the maximum number of interference measurement resources supported by the UE when subframe sets are not configured.

In another configuration, a restriction is placed on the number of CSI processes. As previously discussed, the CSI process may link a channel measurement resource with an interference measurement resource for the CSI reporting. In some cases, although the maximum number of channel measurement resources and interference measurement resources are limited, the number of possible CSI processes may still be large. Thus, the maximum number of supported CSI processes may also be limited. The maximum number of supported CSI processes may be an absolute pre-defined number or may be based on a UE capability that is signaled by the UE to the network. For example, the UE capability signaling may indicate that the UE supports a specific number of CSI processes. This number may be selected by the UE and may depend on implementation constraints or other factors.

In another configuration, channel measurement resources and interference measurement resources may be configured to occur in the same subframe. In some cases, the interference conditions that are outside the control of a specific CoMP cluster may be similar in such a subframe. The commonality of interference conditions from outside a set of coordinating cells may be beneficial for CSI reporting. Alternatively, in another configuration, the interference measurement resources may be configured to occur in separate subframes so that the interference measured based on interference measurement resources is diverse. In this configuration, the interference measurement resources are associated with different CSI processes.

In another configuration, the periodicity for the interference measurement resources and channel measurement resources can be aligned with muting configurations. Specifically, in some cases, when channel measurement resources and interference measurement resources are located in different subframes, zero-power CSI-RS resources may not be configured in both the subframes that contain the channel measurement resources and in the subframes that contain the interference measurement resources. The potential restriction on subframes zero-power CSI-RS may be specified because the zero-power CSI-RS may only be configured with one subframe offset and periodicity. Consequently, the zero-power CSI-RS may not be configured to be present in both the subframes that include channel measurement resources and the subframes that include interference measurement resources.

Thus, in one configuration, the periodicity of channel measurement resources and interference measurement resources may be selected to correspond to an integer multiple of the zero-power CSI-RS periodicity. Further, the subframe offset of channel measurement resources and interference measurement resources may be selected so that both the channel measurement resources and the interference measurement resources in subframes associated with zero-power CSI-RS. For example, when channel measurement resources are transmitted in two separate subframes, if both of the subframes are transmitted with a periodicity of 10 ms and with an offset of 5 ms, the existing muting configurations may be used to mute for channel measurement resources in each subframe. However, if the offset and the periodicity of each subframe that includes the channel measurement resources are not aligned, then the muting may not be possible when only a single muting configuration is supported.

Another aspect of the present disclosure is directed to increasing a worst-case CSI re-computation period. The worst-case UE processing complexity may increase or decrease based on a CSI feedback processing timeline. In LTE Release 10, only one CSI process corresponding to a single non-zero power CSI-RS resource is supported. Therefore, the periodicity for channel measurement resources is 5 ms, at most.

However, in LTE Release 11, the CSI feedback may be initiated based on multiple channel measurement resources. The channel measurement resources may correspond to different non-zero power CSI-RS resources, each of which may be configured with a different subframe configuration parameter, such as the subframeConfig parameter. For interference measurements, interference measurement resources provide for dedicated interference measurement with a 5 ms periodicity. It should be noted that even if more than one interference measurement resource is supported, the interference measurement resources would still be located within the same subframe due to the common subframe configuration of zero power CSI-RS-resources.

Figure 7A:
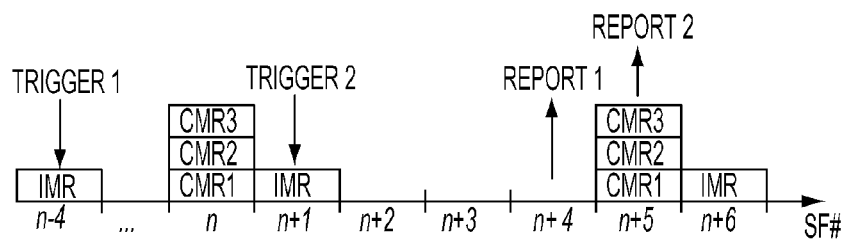
FIGS. 7A and 7B are diagrams illustrating CSI re-computation periods according to aspects of the present disclosure.

In some cases, the complexity of CSI feedback may be increased because the interference measurement resources and the channel measurement resources may not be located within the same subframe. For example, FIG. 7A illustrates an example of a worst-case CSI re-computation period. Specifically, FIG. 7A illustrates a feedback timeline assuming three configured channel measurement resources CMR1, CMR2, CMR3 that all share a common interference measurement resource IMR. The three channel measurement resources CMR1, CMR2, CMR3 are located within the same subframe n but are offset by one subframe in comparison to the subframe n+1 that includes interference measurement resource IMR.

As previously discussed, the CSI measurements may use both interference measurement resources and channel measurement resources. Thus, a re-computation of the CSI information (i.e., RI/PMI/CQI) may be triggered by either an occurrence of an interference measurement resource or a channel measurement resource. A short time period between CSI re-computation may increase the UE complexity. For example, as illustrated in FIG. 7A, the aperiodic CSI trigger 1 in subframe n−4 requests CSI feedback for all channel measurement resources of subframe n based on the interference measurement resource occurrence in subframe n−4. The CSI reports (report 1) based on the interference measurement resource of subframe n−4 and the channel measurement resources of subframe n is reported at subframe n+4. Additionally, the CSI reports (report 2) that are triggered in subframe n+1 (trigger 2) cause a re-computation of all three channel measurement resource reports of subframe n based on the interference measurement resource occurrence in subframe n+1. This leads to a worst-case re-computation interval of just one subframe, possibly for all configured CSI processes.

Still, based on various configurations, the worst-case CSI re-computation period may be increased. In one configuration, when the interference measurement resources and channel measurement resources are restricted to be within a same subframe, the CSI re-computation for a given CSI process occurs, at most, every 5 ms. Accordingly, the CSI re-computation periodicity may be in line with the minimum periodicity of non-zero power and zero power CSI-RS resources. Furthermore, the CSI re-computation periodicity of the present configuration may be aligned with an alignment of the channel measurement resource and interference measurement resource reporting periodicity.

According to another configuration, the worst-case CSI re-computation period may be improved by specifying a CSI re-computation trigger. The CSI re-computation trigger may be configured by the network and may be used to identify the subframes that should be used for performing a CSI re-computation. In this configuration, a stand-alone occurrence of the channel measurement resources and interference measurement resources may not trigger a CSI re-computation. Rather, in the present configuration, a UE only performs the re-computation when the UE identifies a subframe that is configured as a CSI re-computation trigger. The CSI re-computation trigger may be configured via radio resource control signaling and may have a periodicity and an offset setting similar to a subframe configuration parameter, such as the subframeConfig parameter, that is used for non-zero power and zero power CSI-RS configurations. For example, re-computations may be triggered to occur at subframe n, n+5, and n+10. Alternatively, other signaling techniques for configuring the CSI re-computation trigger may be used in place or in addition to the aforementioned configuration.

To reduce the UE complexity in view of the disclosed configurations, the maximum number of CSI re-computation triggers within a specific number of subframes may be limited. For example, according to one configuration, the number of CSI re-computation may be limited to no more than $N_{rt}$ CSI reconfiguration triggers within any 5 ms period. Furthermore, the number of CSI reconfiguration triggers $N_{rt}$ may be either a predefined number or may depend on a UE capability parameter. The UE may transmit the UE capability parameter to the network.

In yet another configuration, the scenarios for re-computing the CSI are re-defined. For example, in the case of a re-computation interval of one subframe (see FIG. 7A), the UE may not use all of the channel measurement resources and/or interference measurement resources regardless of whether the channel measurement resources and/or interference measurement resources are located in or before the reference subframe.

Figure 7B:
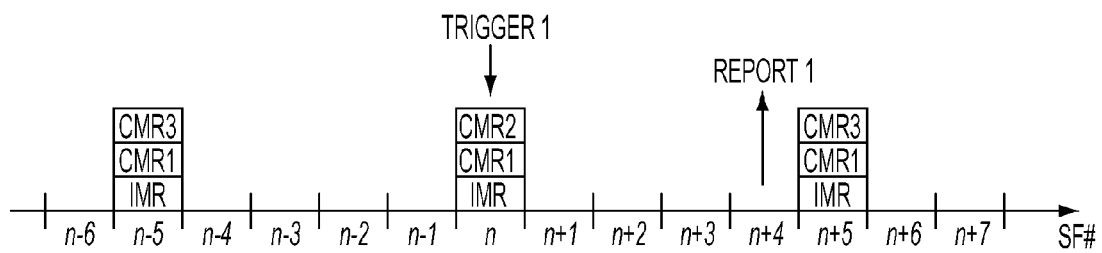

FIG. 7B illustrates an example for reducing the number of CSI computations triggered by channel measurement resources by restricting the number of channel measurement resources for each subframe. Additionally, the number of CSI computations triggered by interference measurement resources may also be restricted. For example, if it is assumed that all channel measurement resources CMR1, CMR2, CMR3 in FIG. 7B are associated with a single interference measurement resource IMR, then the interference measurement resource IMR occurrence in subframe n should not trigger a re-computation of a CSI process associated with the third channel measurement resource (CMR3). That is, the re-computation of three CSI processes resulting from the interference measurement resource occurrence in subframe n would increase the processing load for a report in subframe n+4.

According to another configuration, the CSI re-computation may be mitigated by using outdated channel measurement resources and/or interference measurement resources. For example, as illustrated in FIG. 7B, based on the interference measurement resource IMR in subframe n, the UE may not re-compute CSI process 3 (associated with CMR3 and IMR). Rather, the UE may use outdated CSI computed in subframe n−5 when both CMR3 and IMR were present in the same subframe. The present configuration mitigates CSI re-computation by specifying that the UE can reuse the earlier CSI computation, which has already been computed.

In another configuration, specific rules for instructing the UE to reuse earlier CSI computations may be incorporated into a wireless standard, such as the LTE standard. The earlier CSI computations may refer to CSI computations obtained based on outdated channel measurement resources and/or interference measurement resources. For example, the UE may be signaled a specific "shelf life" for the CSI measurements. That is, the UE may be signaled whether specific outdated channel measurement resources and/or interference measurement resources may be used in the CSI computation. Alternatively, or in addition, the UE may be signaled the number of outdated channel measurement resources and/or interference measurement resources that may be used in the CSI computation.

In some cases, the CSI processes of the CSI process configurations are indexed. Furthermore, the CSI processes may be prioritized based on their corresponding indexes. Thus, in cases where the UE receives a number of CSI requests that exceed the maximum number of supported channel state information processes, the UE may provide outdated CSI reports for the highest indexed processes, to the extent that the number of CSI requests exceed the maximum number of supported channel state information processes. Additionally, the UE may generate at least one channel state information report based on the last indicated measurement resources for the lowest indexed processes up to the maximum number of supported channel state information processes. While indexing provides one basis for prioritizing CSI processes, the prioritization may be based on other approaches, such as, queuing requests based on first in first out (FIFO) order, ignoring requests beyond a maximum supported number of requests, or combining CSI requests that occur every n subframes (where n is greater than one).

Moreover, in one configuration, the use of outdated measurements may be restricted to occurrences in which the CSI re-computation load in a given subframe (or within a certain time period) is greater than a threshold value. The present configuration may specify that outdated CSI are used for the purpose of reducing UE complexity limitations. The aforementioned rules may be incorporated directly into the specification or may be signaled to the UE.

As previously discussed, one aspect of the present disclosure specifies that the channel measurement resources and/or interference measurement resources of the same CSI process should be located within the same subframe. Furthermore, another configuration specifies that CSI re-computations are only triggered by an occurrences of specific reference signals, such as channel measurement resources.

In still another configuration, a restriction is placed on the type of feedback reports that are configured in subframes. Specifically, to reduce the UE's processing load, the types of feedback reports that may be requested by the network in a specified subframe may be restricted. For example, for aperiodic feedback reporting, the network may dynamically trigger the reporting of specific CSI feedback reporting configurations. In general, a restriction may not be placed on the types of feedback reporting configurations that may be requested. Still, by restricting the set of feedback reporting configurations that may be requested by the network in certain subframes, the UE complexity may be reduced because not all types of reporting configuration may be triggered by the network. In this configuration, the UE may distribute feedback computations in time, thereby reducing the UE's complexity.

In another configuration, the restriction on the type of feedback reports that are configured in subframes are indicated by the radio resource control. That is the radio resource control may configure only certain sets of feedback reporting configurations on a per subframe basis. A bitmap may be used to signal the restriction of the feedback report types. The bitmap may be a function of the subframe number. In yet another configuration, the restriction of the feedback report types may be associated with the type of subframe (e.g., multimedia broadcast multicast service single frequency network (MBSFN) or non-MSBSFN). Alternatively, the restriction of the feedback report types may be based on the subframe sets comprising CSI subframe restriction.

Another aspect of the present disclosure is directed to the triggering of aperiodic CSI reports. That is, the CSI process requests may be aperiodic. In some cases, multiple CSI processes may be supported. Therefore, there may be a need to dynamically trigger specific CSI processes. In one configuration, the aperiodic CSI request field may be used to dynamically trigger specific CSI processes. That is, the mapping of the bits comprising this CSI request field may be linked to radio resource control configured CSI processes. For example, a specific bit combination in the CSI request field may be linked with a specific CSI process (i.e., which type of report to generate). Moreover, the number of bits in the aperiodic CSI request field may be increased because the number of reporting options may be increased in CoMP.

In another aspect of the present disclosure, implicit signaling may be used to trigger different channel state information reporting configurations. Moreover, the implicit signaling may also be used in combination with the aperiodic CSI request field. The implicit signaling may be associated with a number of parameters. In one configuration, the implicit signaling may be associated with the subframe type, such as a MBSFN or non-MBSFN subframe, or the restricted CSI subset of the subframe. In another configuration, the implicit signaling may also be based on whether a trigger is received via a legacy control channel, such as a PDCCH, or the EPDCCH. In still yet another configuration, the implicit signaling may be based on the DCI format type. In another configuration, a search space may be partitioned and the implicit signaling may be based on the which partition includes the decoded DCI format.

Another aspect of the present disclosure is directed to an aperiodic channel quality indicator (CQI) only transmission in a shared uplink channel, such as the physical uplink shared channel (PUSCH). The CQI-only transmission may use a specific combination of signaling parameters in the grant (i.e., DCI format.) For example, if DCI format 4 is used for the uplink grant, then aperiodic CQI-only may be enabled by setting a modulation and coding scheme index (IMCS) to twenty, a total number of physical resource blocks ($_NPRB$) less than or equal to four (non-carrier aggregation (CA)), $_N$ PRB less than or equal to twenty (CA), and CQI request to one. In case of CoMP, the configuration of $_NPRB$ may be specified as $_NPRB$ less than or equal to a value greater than twenty one to allow for increased flexibility in accommodating both carrier aggregation and CoMP.

Figure 8:
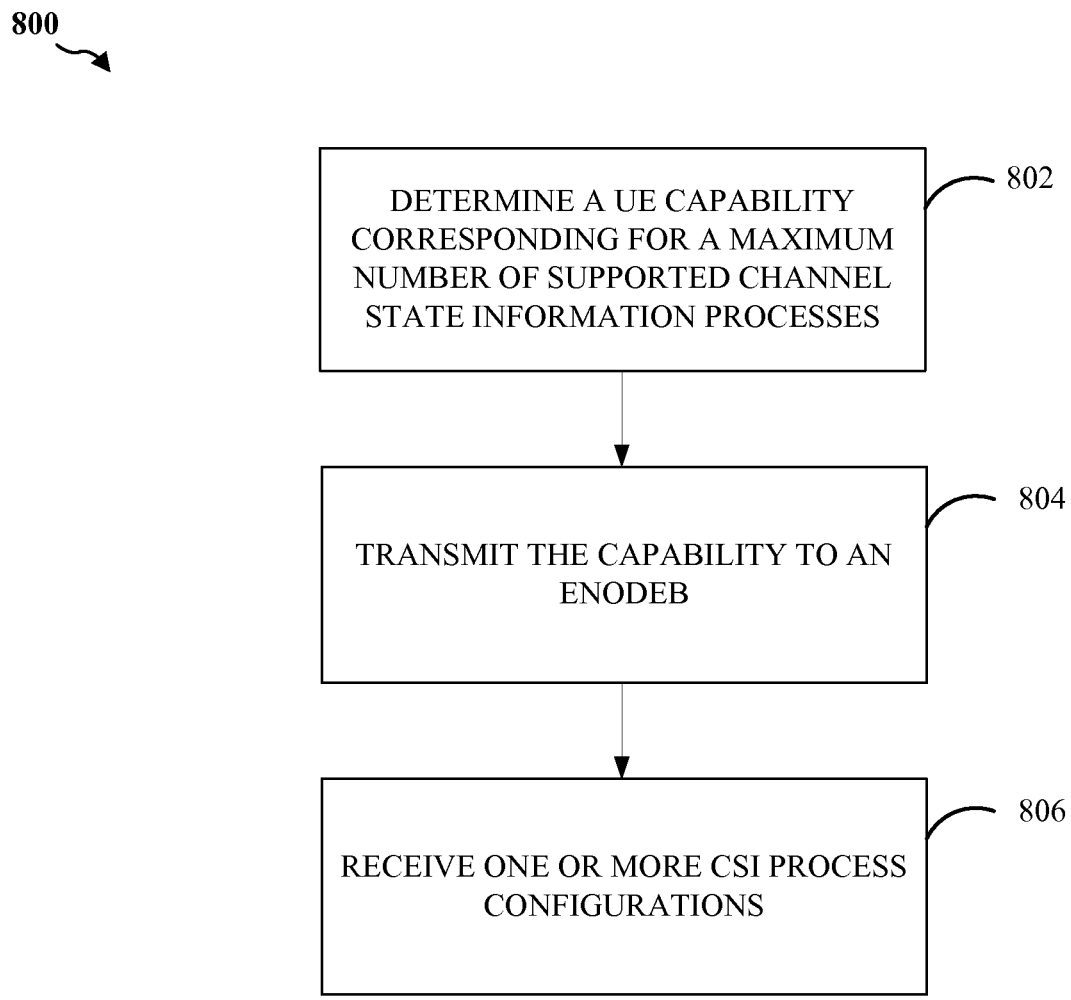
FIGS. 8 and 9 are block diagrams illustrating a method for CSI reporting according to an aspect of the present disclosure.

FIG. 8 illustrates a method 800 for determining a CSI process capability. In block 802, a UE determines a UE capability corresponding to a maximum number of supported channel state information processes. The maximum number of supported channel state information processes may be selected by the UE and may depend on implementation constraints or other factors. The UE transmits the capability to an eNodeB in block 804. The capability may be transmitted via a UE capability parameter in a specific capability signaling message or may be included in other messages transmitted to the eNodeB. Finally, in block 806, the UE receives one or more CSI process configurations. The CSI process configuration may be predefined, and/or signaled statically or signaled semi-statically over RRC or with another communication technique. The configurations may also be associated with index values.

Once the CSI process configuration are signaled to the UE, the eNodeB may dynamically signal CSI requests to the UE. This signaling may include an index value identifying the desired CSI process during a given subframe. The total number of active CSI processes (i.e., or pending CSI requests) may not exceed the UE capability. Each CSI process configuration may identify one or more channel measurement resources and interference measurement resources. The UE may determine the CSI feedback based on both the channel measurement resources and interference measurement resources identified in the CSI process configuration. To the extent that the total number of CSI processes exceed the UE capability, the UE may provide outdated CSI reports as previously discussed based on various prioritization techniques.

In one configuration, the UE 650 is configured for wireless communication including means for determining. In one aspect of the present disclosure, the determining means may be the controller/processor 659, memory 660, receive processor 656, and/or modulators 654, configured to perform the functions recited by the determining means. In another configuration, the UE 650 is configured for wireless communication including means for transmitting. In one aspect of the present disclosure, the transmitting means may be the controller/processor 659, memory 660, transmit processor 668, antennas 652 and/or modulators 654, configured to perform the functions recited by the determining means. In another configuration, the UE 650 is configured for wireless communication including means for receiving. In one aspect of the present disclosure, the receiving means may be the controller/processor 659, memory 660, receive processor 656, antennas 652 and/or modulators 654, configured to perform the functions recited by the receiving means. In another aspect, the aforementioned means may be any module or any apparatus configured to perform the functions recited by the aforementioned means.

Figure 9:
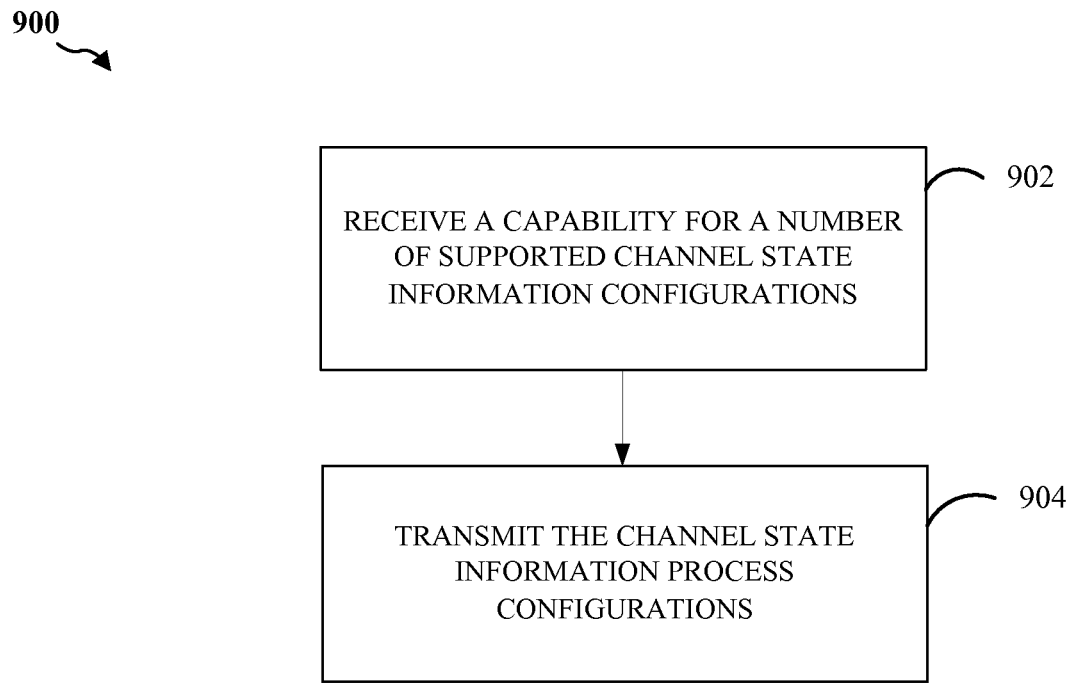

FIG. 9 illustrates a method 900 for transmitting CSI process configurations. In block 902, the eNodeB may receive a capability for a number of supported channel state information configurations. The maximum number of supported channel state information processes may be selected by the UE and may depend on implementation constraints or other factors. The capability may be transmitted via a specific capability signaling message or may be included in other messages transmitted to the eNodeB. In block 904, the eNodeB transmits the channel state information process configurations. The CSI process configuration may be signaled statically or signaled semi-statically over RRC or another communication technique. The CSI process configurations may also be associated with index values.

Once the CSI process configuration are signaled to the UE, the eNodeB may dynamically signal CSI requests to the UE. This signaling may include an index value identifying the desired CSI process during a given subframe. Each CSI process configuration may include one or more channel measurement resources and interference measurement resources. The UE may determine the CSI feedback based on both the channel measurement resources and interference measurement resources identified in the CSI process configuration. The eNodeB may limit the number of dynamically signaled CSI requests based on the maximum number of UE supported channel state information processes. However, the UE may be configured to provide outdated CSI reports if the channel state information processes exceed the maximum number of UE supported channel state information processes.

In one configuration, the eNodeB 610 is configured for wireless communication including means for receiving. In one aspect, the receiving means may be the receive processor 670, demodulators 618, controller/processor 675, and/or antenna 620, configured to perform the functions recited by the receiving means. In another configuration, the eNodeB 610 is configured for wireless communication including means for transmitting. In one aspect, the transmitting means may be the controller/processor 675, memory 646, demodulators 618, antenna 620, and/or transmit processor 616 configured to perform the functions recited by the limiting means. In another aspect, the aforementioned means may be any module or any apparatus configured to perform the functions recited by the aforementioned means.

Figure 10:
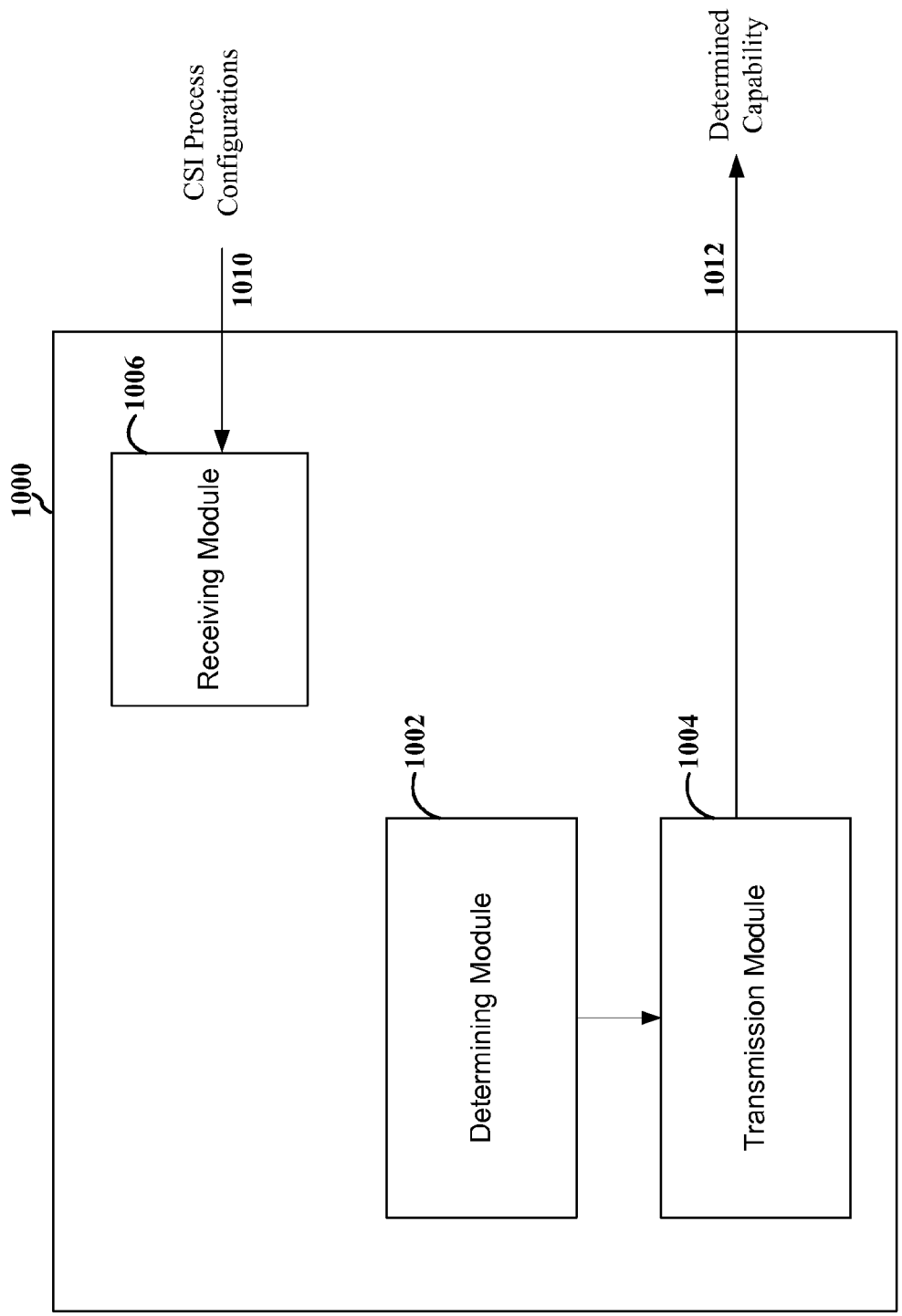
FIGS. 10 and 11 are conceptual data flow diagrams illustrating the data flow between different modules/means/components in an exemplary apparatus.

FIG. 10 is a conceptual data flow diagram illustrating the data flow between different modules/means/components in an exemplary apparatus 1000. The apparatus 1000 includes a determining module 1002 that determines a UE capability corresponding to a maximum number of supported channel state information processes. The determined capability is transmitted on a signal 1012 via a transmission module 1004. The transmission module 1004 receives the determine capability from a signal transmitted from the determining module 1002. The apparatus 1000 may also include a receiving module 1006 that receives one or more CSI process configurations. The receiving module 1006 may receive the CSI process configurations via a signal 1010. The apparatus may include additional modules that perform each of the steps of the process in the aforementioned flowchart of FIG. 8. As such, each step in the aforementioned flowchart FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
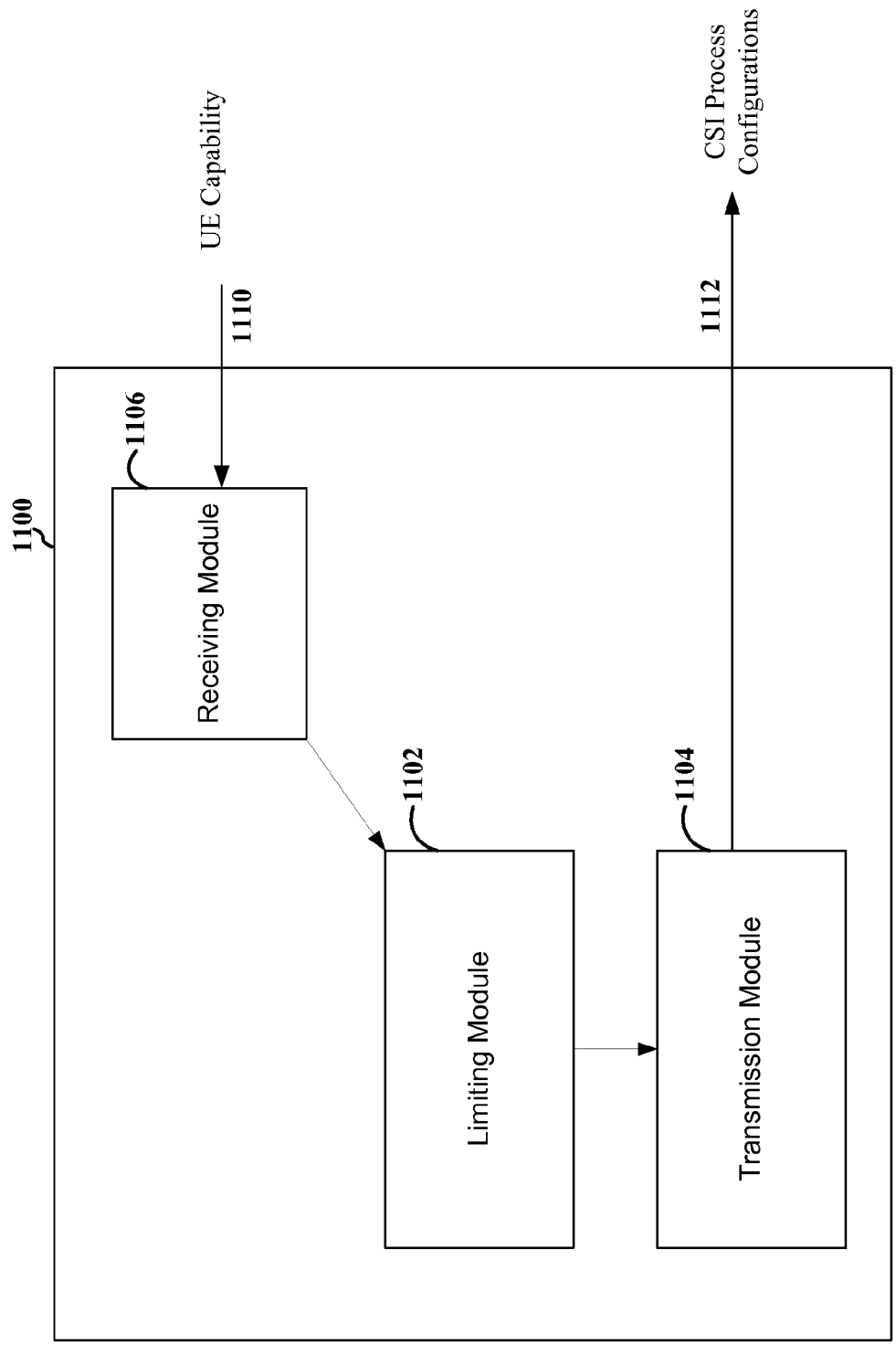

FIG. 11 is a conceptual data flow diagram illustrating the data flow between different modules/means/components in an exemplary apparatus 1100. The apparatus 1100 includes a limiting module 1102 that limits a number of channel state information process requests transmitted to a UE based at least in part on the received capability. The limiting module 1102 transmits the channel state information request limit to the transmission module 1104. Based on the channel state information request limit received from the limiting module 1102, the transmission module 1104 may transmit channel state information process configurations via a signal 1112. The transmission module 1104 receives a limit for the number of channel state information requests from the limiting module 1102. The apparatus 1100 may also include a receiving module 1106 that receives a determined capability from a UE. The receiving module 1106 may receive the determined capability via a signal 1111. The receiving module 1106 may also communicate the determined capability to the limiting module 1102. The apparatus may include additional modules that perform each of the steps of the process in the aforementioned flowchart of FIG. 9. As such, each step in the aforementioned flowchart FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
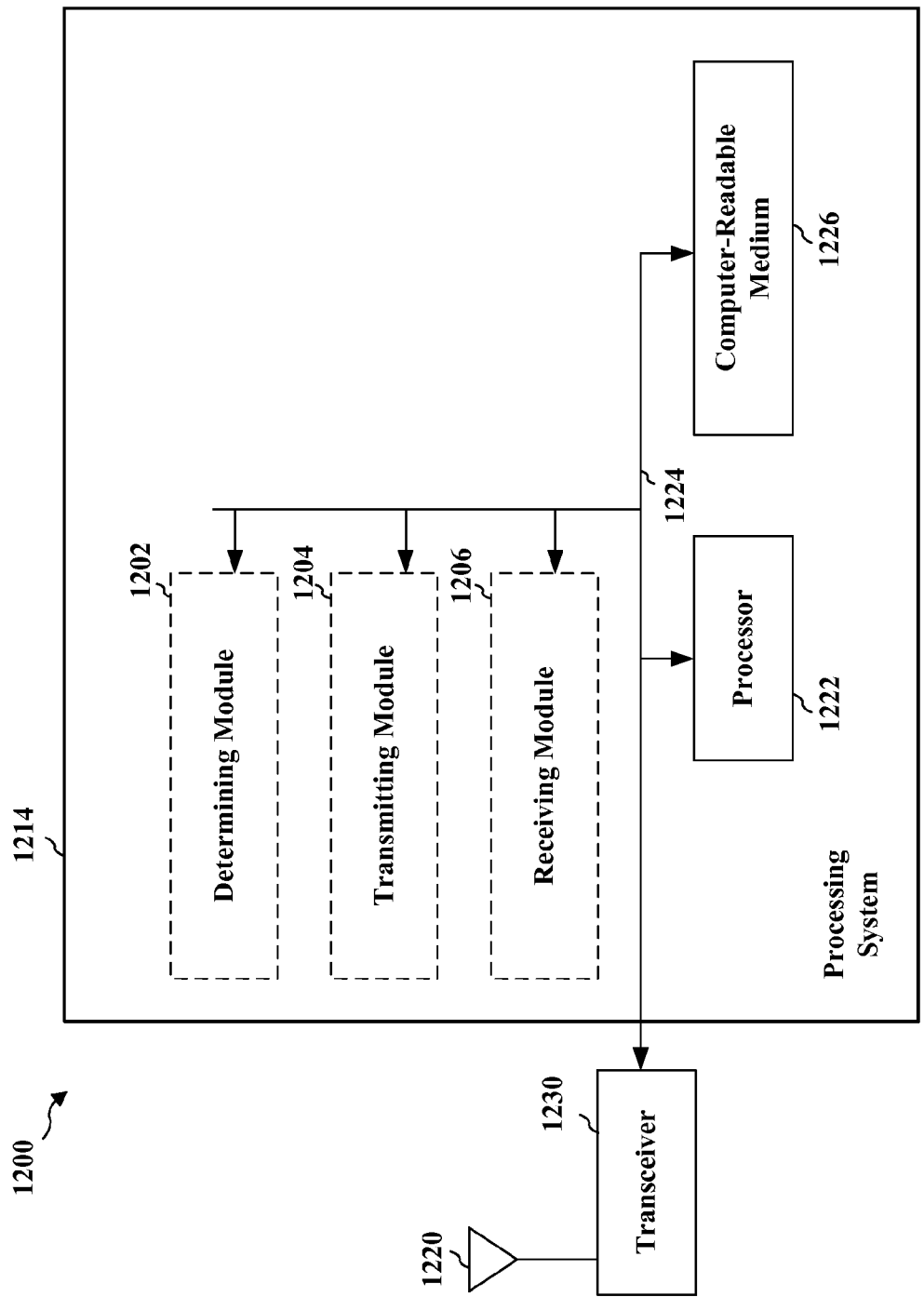
FIGS. 12 and 13 are block diagrams illustrating different modules/means/components in an exemplary apparatus.

FIG. 12 is a diagram illustrating an example of a hardware implementation for an apparatus 1200 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1222 the modules 1202, 1204, 1206 and the computer-readable medium 1226. The bus 1224 may also link various other circuits such as timing sources, peripherals, voltage regulators, and power management circuits, which are well known in the art, and therefore, will not be described any further.

The apparatus includes a processing system 1214 coupled to a transceiver 1230. The transceiver 1230 is coupled to one or more antennas 1220. The transceiver 1230 enables communicating with various other apparatus over a transmission medium. The processing system 1214 includes a processor 1222 coupled to a computer-readable medium 1226. The processor 1222 is responsible for general processing, including the execution of software stored on the computer-readable medium 1226. The software, when executed by the processor 1222, causes the processing system 1214 to perform the various functions described for any particular apparatus. The computer-readable medium 1226 may also be used for storing data that is manipulated by the processor 1222 when executing software.

The processing system 1214 includes a determining module 1202 for determining a UE capability corresponding to a maximum number of supported channel state information processes. The processing system 1214 also includes a transmitting module 1204 for transmitting the determined capability to an eNodeB. The processing system 1214 further includes a receiving module 1206 for receiving one or more CSI process configurations. The modules may be software modules running in the processor 1222, resident/stored in the computer-readable medium 1226, one or more hardware modules coupled to the processor 1222, or some combination thereof. The processing system 1214 may be a component of the UE 650 and may include the memory 660, and/or the controller/processor 659.

Figure 13:
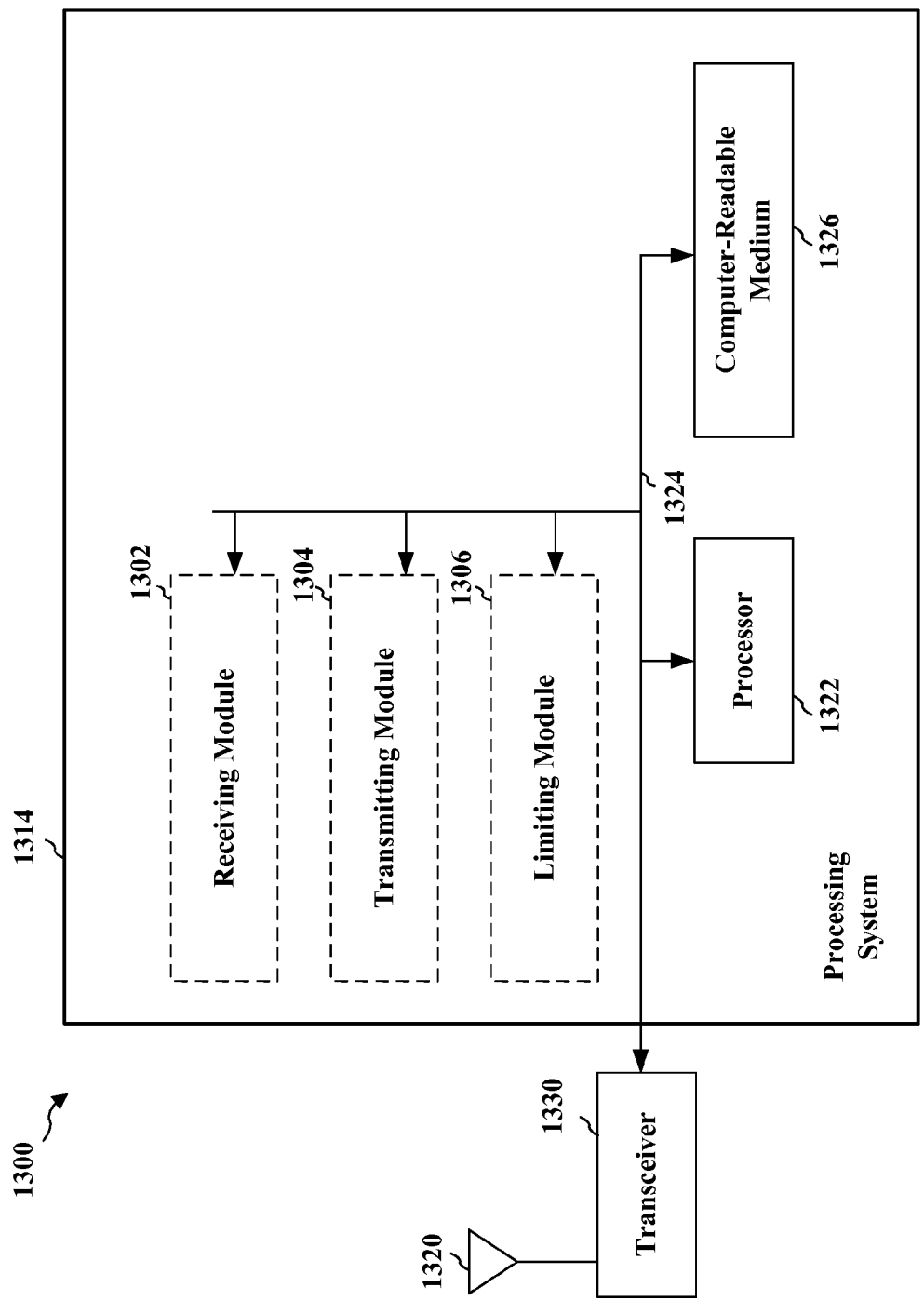

FIG. 13 is a diagram illustrating an example of a hardware implementation for an apparatus 1300 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1322 the modules 1302, 1304, 1306, and the computer-readable medium 1326. The bus 1324 may also link various other circuits such as timing sources, peripherals, voltage regulators, and power management circuits, which are well known in the art, and therefore, will not be described any further.

The apparatus includes a processing system 1314 coupled to a transceiver 1330. The transceiver 1330 is coupled to one or more antennas 1320. The transceiver 1330 enables communicating with various other apparatus over a transmission medium. The processing system 1314 includes a processor 1322 coupled to a computer-readable medium 1326. The processor 1322 is responsible for general processing, including the execution of software stored on the computer-readable medium 1326. The software, when executed by the processor 1322, causes the processing system 1314 to perform the various functions described for any particular apparatus. The computer-readable medium 1326 may also be used for storing data that is manipulated by the processor 1322 when executing software.

The processing system 1314 includes a receiving module 1302 for receiving a capability for a number of supported channel state information configurations. Additionally, the processing system 1314 includes a transmitting module 1304 for transmitting channel state information configurations. The processing system 1314 may also include a limiting module 1306 for limiting a number of channel state information configurations transmitted to a user equipment (UE) based at least in part on the received capability. The modules may be software modules running in the processor 1322, resident/stored in the computer-readable medium 1326, one or more hardware modules coupled to the processor 1322, or some combination thereof. The processing system 1314 may be a component of the eNodeB 610 and may include the memory 676, and/or the controller/processor 675.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, at a user equipment (UE), a maximum number of channel state information (CSI) processes supported for downlink channel measurements by the UE during a specific time period, the CSI processes including CSI resources that experience interference, CSI resources that do not experience interference, or a combination thereof;
   transmitting the UE capability to an eNodeB;
   receiving a plurality of CSI process configurations identifying a plurality of CSI processes that can be requested by the eNodeB; and
   generating at least one outdated CSI report for a specific CSI process based at least in part on a previously generated CSI report when a number of CSI processes requested by the eNodeB is greater than the maximum number of CSI processes.

2. The method of claim 1, further comprising:
   receiving at least one CSI request for at least one CSI process, the at least one CSI request causing a number of CSI processes within the specific time period to be greater than the maximum number of CSI processes; and
   transmitting the at least one outdated CSI report.

3. The method of claim 2, in which:
   the plurality of CSI processes identified by the plurality of CSI process configurations are indexed, and
   the at least one outdated CSI report is a highest indexed process that exceeds the maximum number of supported CSI processes.

4. The method of claim 3, further comprising
   generating at least one CSI report based at least in part on last indicated measurement resources for a lowest indexed CSI process up to the maximum number of supported CSI processes.

5. The method of claim 2, in which the plurality of CSI processes identified by the plurality of CSI process configurations are aperiodic CSI process requests.

6. The method of claim 1, further comprising:
   generating a CSI report based at least in part on a CSI report request; and
   transmitting the CSI report.

7. A method of wireless communication, comprising:
   receiving a capability for a maximum number of supported channel state information (CSI) processes supported for downlink channel measurements by the UE during a specific time period, the CSI processes including CSI resources that experience interference, CSI resources that do not experience interference, or a combination thereof;
   transmitting a plurality of CSI process configurations identifying a plurality of CSI processes that can be requested by an eNodeB; and
   receiving at least one outdated CSI report for a specific CSI process based at least in part on a previously generated CSI report when a number of CSI processes requested by the eNodeB is greater than the maximum number of CSI processes.

8. The method of claim 7, further comprising limiting a number of CSI requests transmitted to a user equipment (UE) based at least in part on the received capability.

9. The method of claim 7, further comprising transmitting at least one CSI request for at least one CSI process, the at least one CSI request causing a number of CSI processes within the specific time period to be greater than the maximum number of CSI processes.

10. A user equipment (UE) for wireless communications, comprising:
    a memory; and
    at least one processor coupled to the memory, the at least one processor being configured:

to determine a maximum number of channel state information (CSI) processes supported for downlink channel measurements by the UE during a specific time period, the CSI processes including CSI resources that experience interference, CSI resources that do not experience interference, or a combination thereof;
to transmit the UE capability to an eNodeB;
to receive a plurality of CSI process configurations identifying a plurality of CSI processes that can be requested by the eNodeB; and
to generate at least one outdated CSI report for a specific CSI process based at least in part on a previously generated CSI report when a number of CSI processes requested by the eNodeB is greater than the maximum number of CSI processes.

11. The UE of claim 10, in which the at least one processor is further configured:
to receive at least one CSI request for at least one CSI process, the at least one CSI request causing a number of CSI processes within the specific period to be greater than the maximum number of CSI processes; and
to transmit the at least one outdated CSI report.

12. The UE of claim 11, in which:
the plurality of CSI processes identified by the plurality of CSI process configurations are indexed, and
the at least one outdated CSI report is a highest indexed process that exceeds the maximum number of supported CSI processes.

13. The UE of claim 12, in which the at least one processor is further configured to generate at least one CSI report based at least in part on last indicated measurement resources for a lowest indexed CSI process up to the maximum number of supported CSI processes.

14. The UE of claim 11, in which the plurality of CSI processes identified by the plurality of CSI process configurations are aperiodic CSI process requests.

15. The UE of claim 10, in which the at least one processor is further configured:
to generate a CSI report based at least in part on a CSI report request; and
to transmit the CSI report.

16. An apparatus for wireless communications, comprising:
a memory; and
at least one processor coupled to the memory, the at least one processor being configured:
to receive a capability for a maximum number of supported channel state information (CSI) processes supported for downlink channel measurements by the UE during a specific time period, the CSI processes including CSI resources that experience interference, CSI resources that do not experience interference, or a combination thereof;
to transmit a plurality of CSI process configurations identifying a plurality of CSI processes that can be requested by an eNodeB; and
to receive at least one outdated CSI report for a specific CSI process based at least in part on a previously generated CSI report when a number of CSI processes requested by the eNodeB is greater than the maximum number of CSI processes.

17. The apparatus of claim 16, in which the at least one processor is further configured to limit a number of CSI requests transmitted to a user equipment (UE) based at least in part on the received capability.

18. The apparatus of claim 16, in which the at least one processor is further configured:
to transmit at least one CSI request for at least one CSI process, the at least one CSI request causing a number of CSI processes within the specific time period to be greater than the maximum number of CSI processes.

19. An apparatus for wireless communications, comprising:
means for determining, at a user equipment (UE), a maximum number of channel state information (CSI) processes supported for downlink channel measurements by the UE during a specific time period, the CSI processes including CSI resources that experience interference, CSI resources that do not experience interference, or a combination thereof;
means for transmitting the UE capability to an eNodeB;
means for receiving a plurality of CSI process configurations identifying a plurality of CSI processes that can be requested by the eNodeB; and
means for generating at least one outdated CSI report for a specific CSI process based at least in part on a previously generated CSI report when a number of CSI processes requested by the eNodeB is greater than the maximum number of CSI processes.

20. An apparatus for wireless communications, comprising:
means for receiving a capability for a maximum number of supported channel state information (CSI) processes supported for downlink channel measurements by the UE during a specific time period, the CSI processes including CSI resources that experience interference, CSI resources that do not experience interference, or a combination thereof;
means for transmitting a plurality of CSI process configurations, the plurality of CSI process configurations identifying a plurality of CSI processes that can be requested by an eNodeB; and
means for transmitting at least one outdated CSI report for a specific CSI process based at least in part on a previously generated CSI report when a number of CSI processes requested by the eNodeB is greater than the maximum number of CSI processes.

21. A computer program product for wireless communications including a non-transitory computer-readable medium having program code recorded thereon, the program code comprising:
program code to determine, at a user equipment (UE), a maximum number of channel state information (CSI) processes supported for downlink channel measurements by the UE during a specific time period, the CSI processes including CSI resources that experience interference, CSI resources that do not experience interference, or a combination thereof;
program code to transmit the UE capability to an eNodeB;
program code to receive a plurality of CSI process configurations identifying a plurality of CSI processes that can be requested by the eNodeB; and
program code to generate at least one outdated CSI report for a specific CSI process based at least in part on a previously generated CSI report when a number of CSI processes requested by the eNodeB is greater than the maximum number of CSI processes.

22. A computer program product for wireless communications including a non-transitory computer-readable medium having program code recorded thereon, the program code comprising:
program code to receive a capability for a maximum number of supported channel state information (CSI) processes supported for downlink channel measurements by the UE during a specific time period, the CSI processes including CSI resources that experience interference, CSI resources that do not experience interference, or a combination thereof;

program code to transmit a plurality of CSI process configurations identifying a plurality of CSI processes that can be requested by an eNodeB; and program code to receive at least one outdated CSI report for a specific CSI process based at least in part on a previously generated CSI report when a number of CSI processes requested by the eNodeB is greater than the maximum number of CSI processes.

* * * * *